United States Patent [19]

Grocott et al.

[11] Patent Number: 5,042,723
[45] Date of Patent: Aug. 27, 1991

[54] ELECTROSTATIC SPRAYING APPARATUS

[75] Inventors: Arend L. Grocott, Liphook; Timothy J. Noakes, Nr. Alton; Michael L. Green, Sutton Coldfield; Edward H. Wilson, West Sussex, all of England

[73] Assignee: Imperial Chemical Industries PLC, London, England

[21] Appl. No.: 469,528

[22] PCT Filed: Sep. 22, 1987

[86] PCT No.: PCT/GB87/00609
§ 371 Date: Mar. 13, 1990
§ 102(e) Date: Mar. 13, 1990

[87] PCT Pub. No.: WO89/02786
PCT Pub. Date: Apr. 6, 1989

[30] Foreign Application Priority Data

Sep. 1, 1986 [GB] United Kingdom ............ 8621095
Sep. 1, 1987 [GB] United Kingdom ............ 8720547

[51] Int. Cl.⁵ .................................. B05B 5/16
[52] U.S. Cl. ........................ 239/704; 239/171; 244/136
[58] Field of Search ......... 239/171, 690, 704, DIG. 7; 244/136

[56] References Cited

U.S. PATENT DOCUMENTS

| 3,297,281 | 1/1967 | Felici | 239/171 X |
| 3,618,857 | 11/1971 | Rautenbach | 239/171 X |
| 3,887,129 | 6/1975 | Brown | 239/171 X |
| 4,328,940 | 5/1982 | Malcolm | 239/704 X |
| 4,412,654 | 11/1983 | Yates et al. | 239/171 |
| 4,509,694 | 4/1985 | Inculet et al. | 239/704 X |
| 4,542,855 | 9/1985 | Stacey | 239/690 |
| 4,703,891 | 11/1987 | Jackson et al. | 239/171 |

FOREIGN PATENT DOCUMENTS 193348 9/1986 European Pat. Off. .

Primary Examiner—Andres Kashnikow
Assistant Examiner—William Grant
Attorney, Agent, or Firm—Cushman, Darby & Cushman

[57] ABSTRACT

An apparatus is disclosed suitable for electrostatic spraying from fixed wing aircraft. The apparatus includes a linear electrostatic spraying nozzle 2 and electrodes 4 placed near the nozzle's spraying edge to intensify the electric field strength at the spraying edge sufficiently to produce ligaments of the liquid to be sprayed from the spraying edge. In order that the airstream due to the aircraft's movement does not destroy the ligamets, the sprayhead and the electrodes are positioned so that part of the airstream flows between them. The spray head and the electrodes are so shaped and positioned that when directed to spray in substantially the same direction as the airstream, a turbulence free wake is left in the region of the ligaments.

11 Claims, 5 Drawing Sheets

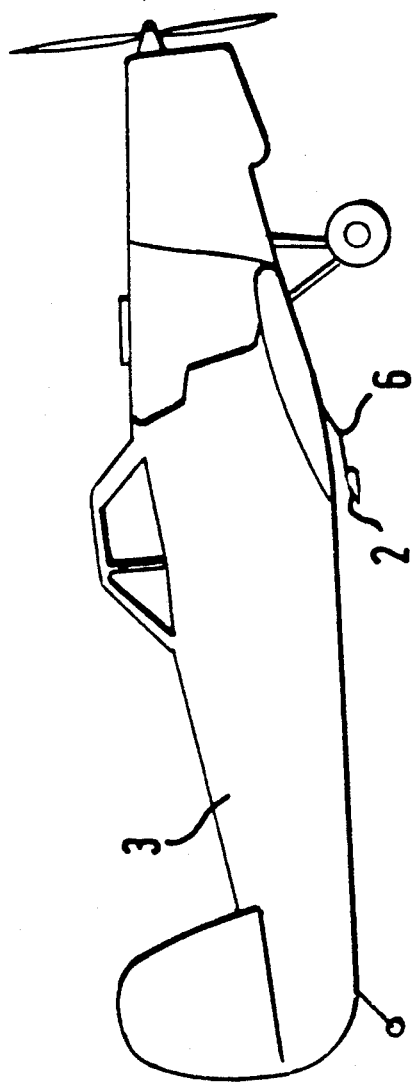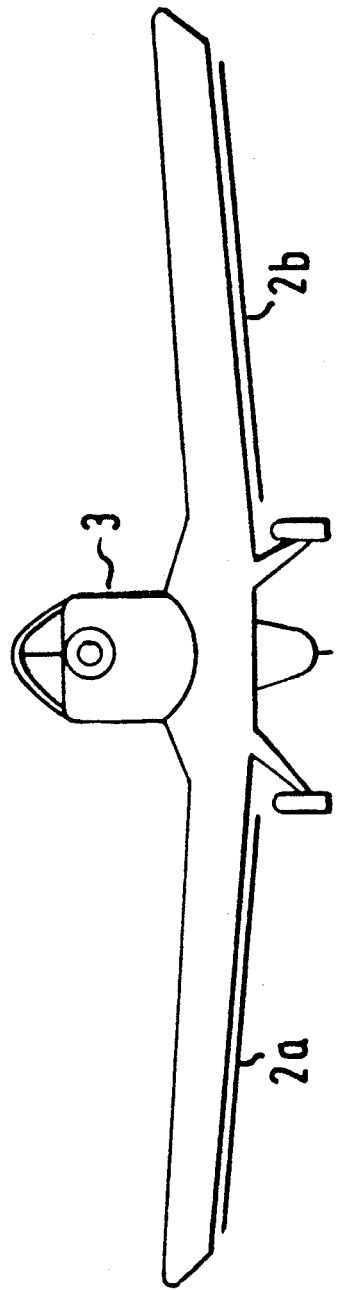

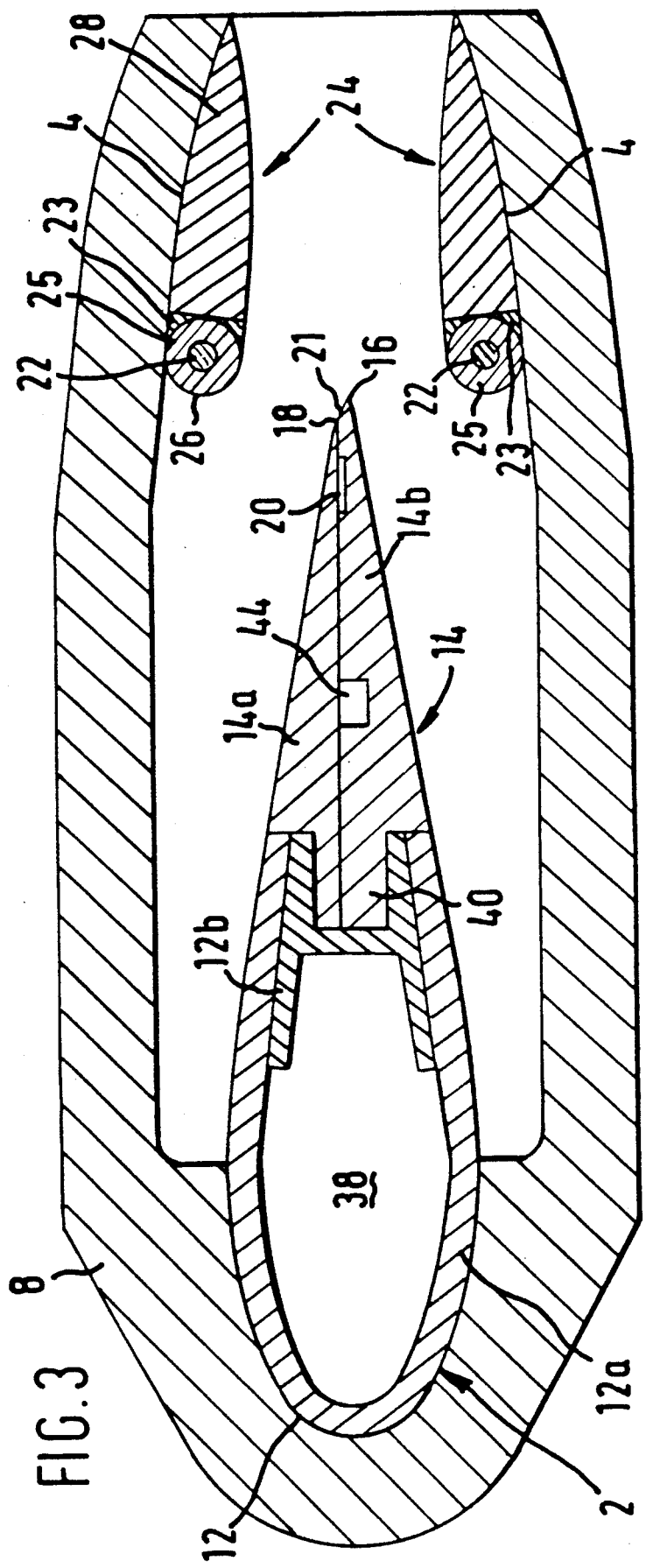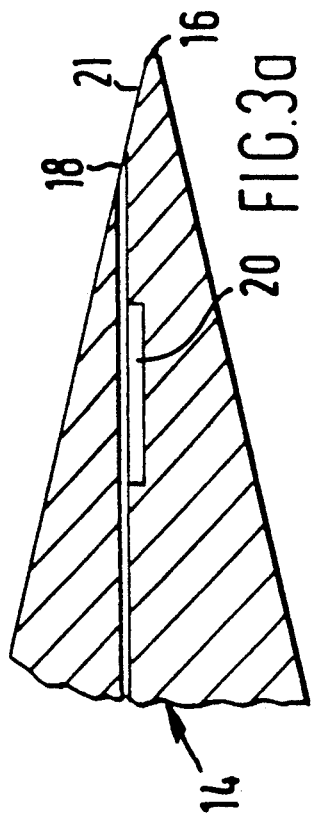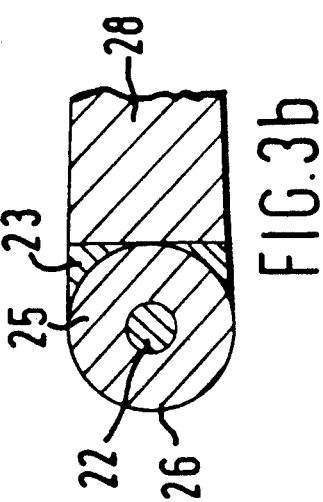

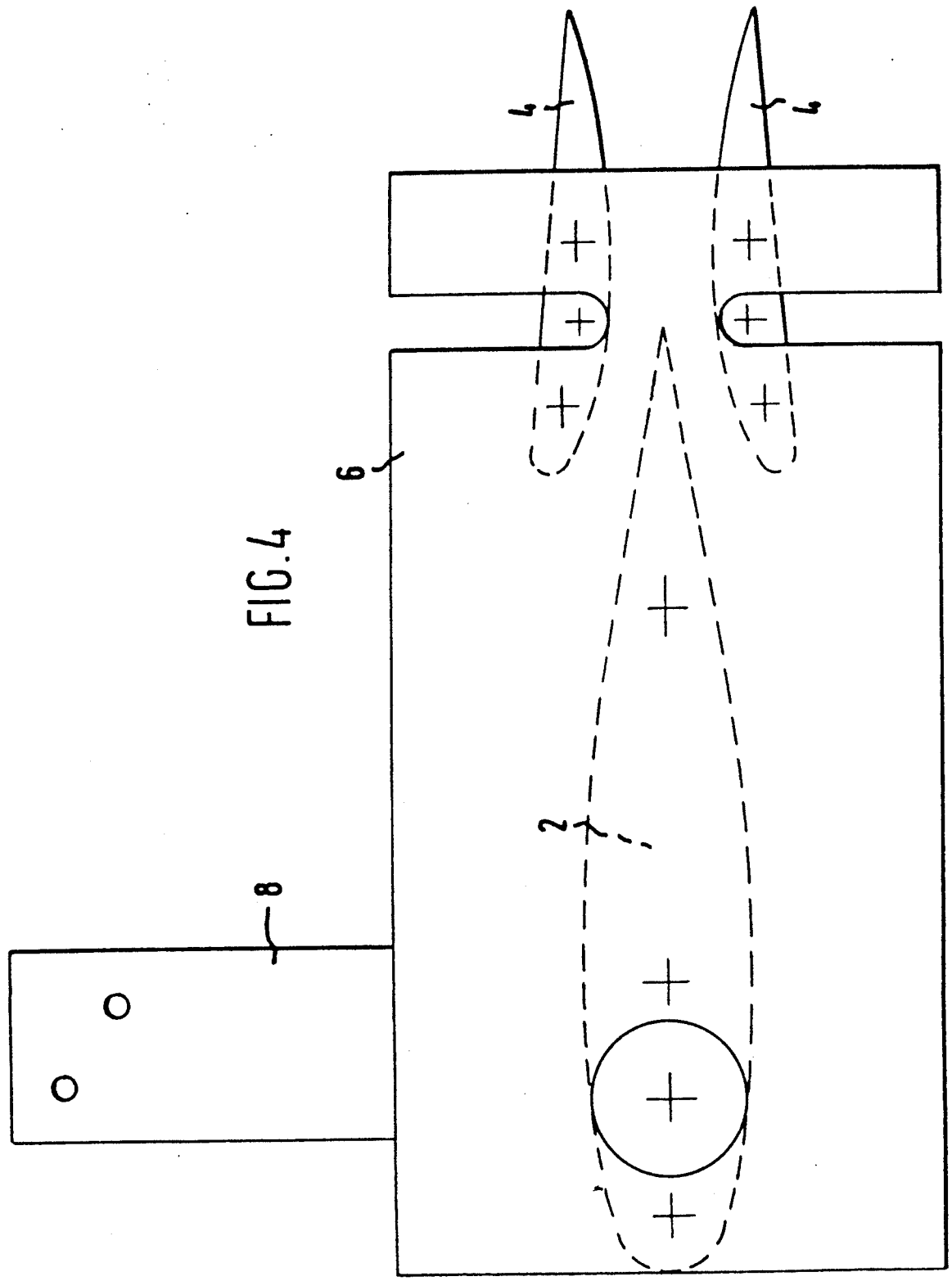

ELECTROSTATIC SPRAYING APPARATUS

FIELD OF THE INVENTION

This invention relates to electrostatic spraying apparatus.

BACKGROUND OF THE INVENTION

One of the advantages of electrostatic spraying is that the charged spray tends to wrap around the target. This can be of particular use in, say, agricultural spraying because the spray will cover both sides of the leaves of a plant, not merely the outer or upper surfaces as would be achieved with conventional spraying. Another feature is that the attraction of the spray to the target may reduce the amount lost by drift. More or most of the spray reaches its intended target. This reduces the total amount of spray which has to be used which reduces the cost of effective treatment and is thought to be generally better for the environment.

Electrostatic spraying apparatus is known in which a spray head has a spraying edge, an electrically conducting or semiconducting surface and means for delivering liquid to be sprayed to the edge via the surface; an electrode spaced from the edge; and high voltage supply means for generating a high voltage between the surface and the electrode so that, in use, when covered by the liquid to be sprayed, the electric field strength at the edge is intensified sufficiently, that the liquid at the edge is drawn out preponderantly by electrostatic forces into ligaments which break up into electrically charged droplets.

An apparatus falling within this broad type is disclosed in British patent specification No. 1569707.

An advantage of this apparatus is that the ligaments break up into droplets having a very narrow spectrum of diameters. This is preferred because if a droplet of a particular size is required to carry a lethal dose of an insecticide, say, smaller droplets are wasted as ineffective while larger droplets require a larger amount of insecticide to provide the same number of sites.

In order to treat large areas spraying can be effected from aircraft. Although aerial electrostatic spraying has been proposed, e.g. European patent application No. EP-A1-186353, a problem which has not been addressed is that caused by the airstream past the aircraft. In fixed wing aircraft used for spraying, there is an airstream past the vehicle due to its movement and possibly accentuated by the slipstream from a propeller, of the order of 70 mph. The problem cause by the airstream, is that turbulence around the electrostatic spray head interferes with the formation of the ligaments and thus spoils the spectrum of droplet diameters or even prevents spraying.

SUMMARY OF THE INVENTION

In accordance with the invention there is provided apparatus for spraying liquid electrostatically into an airstream comprising: a spray head having a spraying edge, an electrically conducting or semiconducting surface and means for delivering liquid to be sprayed to the edge via the surface; an electrode spaced from the edge; and high voltage supply means for generating a high voltage between the surface and the electrode, the sprayhead comprising an aerofoil the trailing edge of which constitutes the spraying edge, the sprayhead and the electrode being mounted for part of the airstream to pass between them, the shape and position of the sprayed and the electrode producing a sufficiently low turbulence wake in the region of the spraying edge, and the electric field at the edge being intensified sufficiently when covered by liquid to be sprayed, that: the liquid at the edge is drawn out preponderantly by electrostatic forces into ligaments which break up into electrically charged droplets.

BRIEF DESCRIPTION OF THE DRAWINGS

One embodiment of the invention will now be described by way of example, with reference to the accompanying drawings, in which:

FIGS. 1 and 2 show the general disposition on a light aircraft of apparatus embodying the invention;

FIG. 3 shows a cross section through spraying apparatus embodying the invention;

FIGS. 3a and 3b show details of FIG. 3;

FIG. 4 shows an end view of an alternative embodiment;

DETAILED DESCRIPTION

Figure 5:
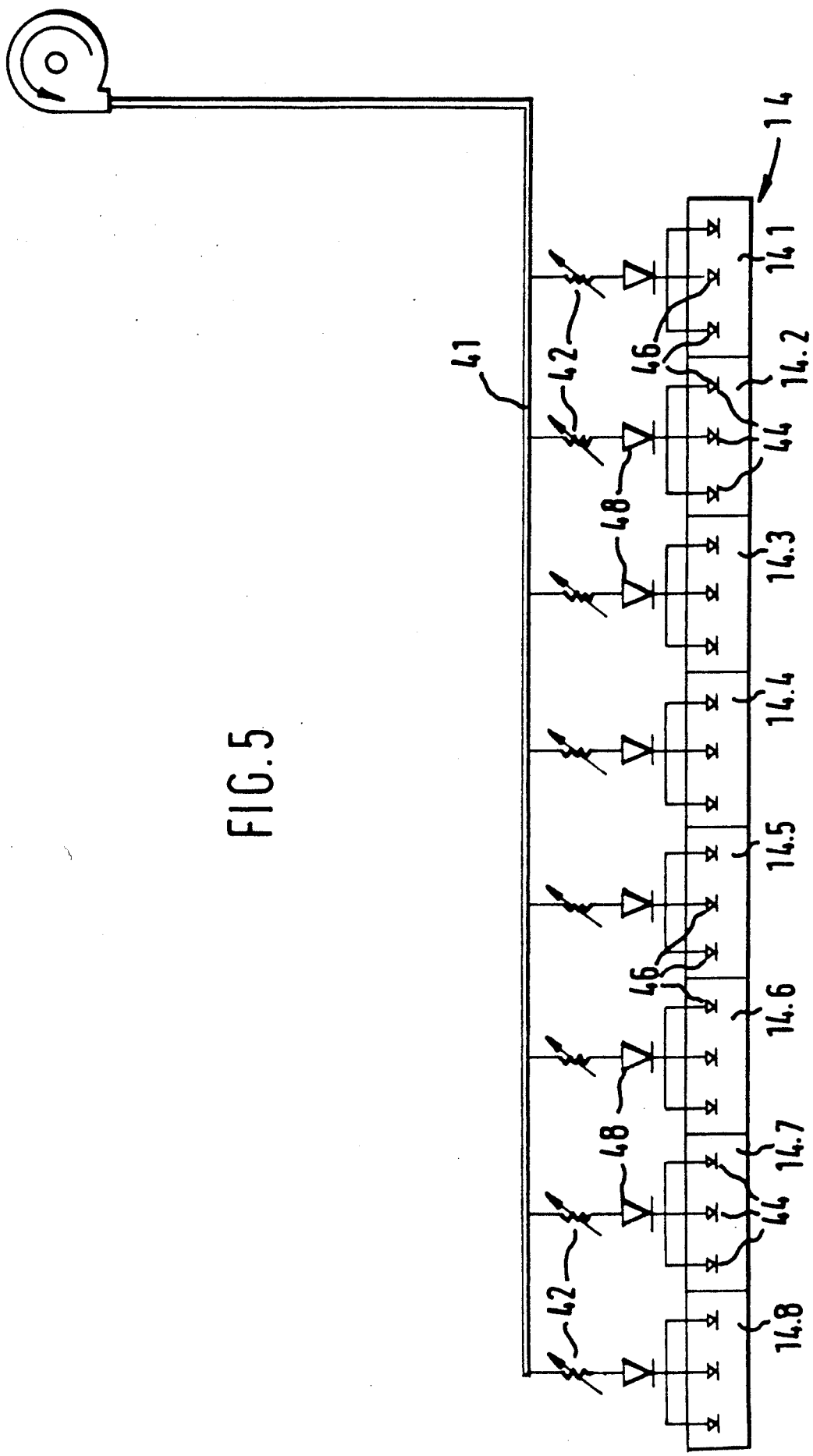
FIG. 5 shows the fluid delivery arrangement of the embodiment of FIG. 3.

Referring to FIGS. 1 and 2, a linear sprayhead 2a, 2b is mounted beneath the trailing edges of each wing of a light aircraft 3. The position of the sprayhead is chosen so that the sprayhead is in turbulence free air and such that the spray is directed substantially parallel to the air flow and does not end up in any substantial quantity on the tail plane of the aircraft. The sprayhead is supported by arms 6 (FIG. 1) attached to brackets 8 (FIG. 3) at intervals of about one half meter.

The spray head 2, shown in FIG. 3, is in the form of an aerofoil body (which in the figure is symmetrical) at the trailing edge of which is a linear nozzle. The body comprises a nose assembly 12 formed generally of insulating materials and a nozzle assembly 14 formed in this case of a semi insulating material, e.g. composite sold under the trade mark Kite Brand by Tufnol Limited of Birmingham England. The nozzle assembly 14 provides the trailing edge 16 of the aeorfoil. The trailing edge 16 also acts as a spraying edge. The nozzle assembly 14 comprises two parts 14a and 14b secured together with a thin spacer therebetween leaving a slot 18, defined by the thickness of the spacer, just forward of the trailing/spraying edge 16.

In use a liquid agrochemical is delivered through the slot 18, via a conducting or semi conducting surface 20, across the exterior surface 21, to the spraying edge 16 from which spraying takes place. The spraying edge is directed between the two opposed electrodes 4.

The electrodes 4 comprise a core 22 of conducting material sheathed by a body 24 partly of semi-insulating material 26 and partly of insulating material 28. The insulating part 28 of the body 24 is formed from glass reinforced plastics by pultrusion. The semi insulating part of the body 24 is a round tube 25 of a material having a resistivity in the range $10^{10}$ to $10^{14}$, more preferably $5 \times 10^{11}$ to $5 \times 10^{13}$ ohm cms. Examples of suitable materials are certain grades of soda glass and phenolformaldehyde/paper composites. The composite sold under the trade mark Kite Brand by Tufnol Limited of Birmingham England has been found particularly suitable. The core 22 is packed iron filings or carbon granules. The tube 25 is bonded and faired to the insulating part 28, by an epoxy filler or adhesive 23.

Figure 6:
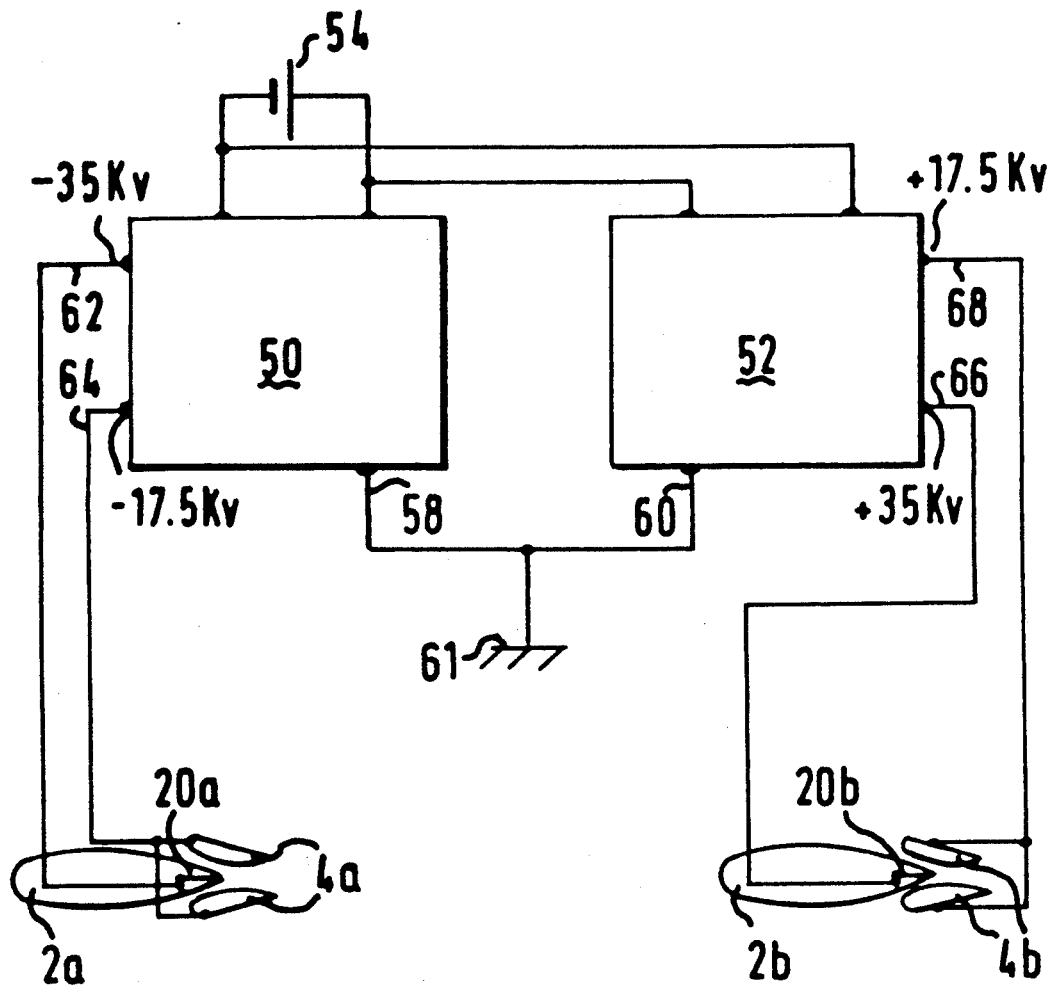
FIG. 6 shows the electrical circuit of the embodiment of FIG. 3.

The conducting or semiconducting surface 20 is connected via one of a pair of supply leads (not illustrated) to one of the output terminals of a high voltage generator 50 or 52 (FIG. 6). The electrode cores 22 are connected by the other of the pair of high voltage supply leads to another voltage output terminal of the high voltage generator, so that in use a high potential difference, e.g. 10 to 35 Kv, is maintained between the surface 20 and the electrode cores 22. Various voltage configurations can be used. Assuming the target is essentially at earth potential, either the electrodes 22 or (as will be explained later) the surface 20 may be at earth potential. Alternatively, the electrodes 22 may be maintained at a potential intermediate that of the surface 20 and that of the target. In our preferred arrangement, the surface 20 is maintained at $\pm 35$ Kv and the electrodes are maintained at an intermediate potential of $\pm 17.5$ Kv. The electrodes thus have a potential of similar polarity to that of the droplets in the spray. Once past the electrodes the droplets thus tend to be repelled by the electrodes. If the electrodes are at ground potential, there is a tendency, especially at high flow rates, for the droplets to be attracted back to the electrodes.

Any suitable circuit arrangement may be used to provide the voltages required at the surface 20 and the electrode cores. In FIG. 6 each generator is illustrated with two high voltage outputs. In another alternative the electrode core voltage is derived by a potential divider from a single output generator.

The edge 16 is sharp to a degree, that combined with the closeness with which the electrode cores 22 are spaced therefrom, enables spraying to take place at a relatively low high-voltage. In use the electric field is defined between the semi insulating part 26 of the electrode sheaths and the liquid arriving at the edge 16. Assuming the surface 20 has a positive potential relative to the electrode cores 22, negative charge is conducted away from the liquid at its contact with the conducting or semiconducting surface, leaving a net positive charge on the liquid. The presence of the electrodes 4 intensifies the electric field at the liquid/air boundary at the edge 16, sufficiently that the liquid is drawn out into ligaments spaced along the edge 16.

The liquid becomes positively charged, negative charge being conducted away by the conducting or semiconducting surface 20, leaving a net positive charge on the liquid. The charge on the liquid produces internal repulsive electrostatic forces which overcome the surface tension of the liquid forming cones of liquid at spaced intervals along the edge 16. From the tip of each cone a ligament issues. At a distance from the edge 16, mechanical forces on the ligament produced by travelling through the air cause it to break up into charged droplets of closely similar size. Mutual repulsion between the droplets causes the spray to expand in a direction transverse to the ligaments. The number of ligaments, which are formed depends on the flow rate of the liquid and on the electric field intensity amongst other factors such as the resistivity and the viscosity of the liquid. All other things being constant, controlling the voltage and the flow rate controls the number of ligaments, which enables the droplet size to be controlled and very closely similar.

If the conducting surface is separate from the spraying edge 16, we find it necessary to dimension the spacing therebetween suitably, in relation to the resistivity of the liquid being sprayed. We find that spraying will not take place if, given a spacing, the resistivity of the liquid is too high or, conversely, given a particular resistivity, the spacing is too great. A possible explanation for this observation is that in addition to the liquid becoming charged as it passes over the conducting or semiconducting surface, there is also conduction of charge away from the liquid at edge 16 through the liquid. The resistance of this path must not be so high that the voltage drop across it results in the voltage at the edge 16 being too low to produce an atomising field strength. The distance between the edge 16 and the conducting or semiconducting surface must therefore be sufficiently small to allow for the resistivity of the liquid being used. We have found that a suitable position can be found for the surface even when spraying, say, a liquid having a resistivity in the range $10^6$ to $10^{10}$ ohm cm.

Since the electrical connections are made to the core 22, the surface of the body 24 is not at a uniform potential. The surface potential will be lowest on the semi insulating material 26 near the core 22 and it is here that the flux in the electric field between the edge 16 and the electrodes will concentrate. In order to permit maximum electrical stress to be applied between the edge 16 and the electrode body in the region of the core 22, without surface tracking leading to corona discharge between more closely spaced points, the core and the sheath are so shaped and positioned as to be closest to the spray head at the spraying edge. In the example illustrated, the core is packed iron fillings or carbon granules.

It is important that the area near the spraying edge where the ligaments are formed is substantially free from airflow transverse to the ligaments. This would spoil or even prevent formation of the ligaments. To this end, the three aerofoils are so shaped as to each leave a low turbulence wake, when the spray head is substantially aligned with the general direction of the airstream. In the area downstream of the spraying edge 16, it is desired to give the droplets as little opportunity as practical to deposit on the electrodes. To this end, the electrode bodies curve away from each other towards their trailing edges creating an expanding passage. The airstream passing through this passage is thus decelerating, creating an environment in which it is difficult to remove turbulence completely. However, sufficiently low turbulence can be achieved to permit the formation of stable ligaments by electrostatic forces and in practice the arrangement can have an angle of incidence of 10 of 15 degrees or so to the general direction of the air stream, before it stalls creating a turbulent wake. This enables spraying to take place through the normal range of attitudes of the aircraft.

At high spraying rates and/or high potential differences between the surface 20 and the electrode cores 22, there is a tendency for droplets of the spray to contaminate the electrodes. This tendency will be reduced by the air flow over the edge 16 which will assist the droplets away from the electrodes faster than they can migrate transverse to the airflow.

In the arrangement illustrated in FIG. 3, it is found that the forward movement of the aircraft produces sufficient airflow to remove the droplets before they contaminate the electrodes. Too great an airflow would produce air shear on the liquid on the surface 21, tending to strip it off the surface before it reaches the edge 16. It is, however, possible to enhance the effect by the particular shape and position of the electrode aerofoils. A circumstance in which it might be desired to enhance the airflow is if the droplets are found otherwise to be depositing on the electrodes. Such a condition might arise if it were necessary to make the electrodes large in order to achieve stiffness. Suitable aerofoils to enhance the flow are illustrated in FIG. 4. These are substantially flat in section on the side remote from the edge 16, so encouraging the beneficial air flow through the space between them and the spray head, at the expense of the airflow around the outside. In this arrangement, the position of the electrode bodies encourages the airflow to be in the direction of the ligaments, with no substantial transverse component, assisting the spray head to resist stalling.

Without the provision of the air flow between the electrodes and the spraying edge, if the conducting or semiconducting surface 20 were arranged at earth potential and the electrodes 4 were at a high (positive or negative) voltage, most of the droplets would deposit on the electrodes. With the present provision of an air flow, it is possible to spray using such an arrangement. A sufficient flow of non turbulent air can protect the electrodes even in this extreme case.

The nose assembly 12 of the sprayhead comprises two parts: a skin 12a and a generally I-section beam 12b. Both are manufactured from glass reinforced plastics by pultrusion. The skin 12a and beam 12b are assembled together by screws leaving a hollow cavity 38 through which pipework and high tension electrical leads (not shown in FIG. 3) supply liquid to be sprayed and high voltage respectively, to the nozzle. The nozzle assembly 14 conforms to the exterior shape of the nose assembly 12 so as to form part of the aerofoil section. The nozzle assembly 14 has a projection 40 along its length, which is a push fit between the flanges of the beam 12b. Push together electrical and fluid connectors (not shown) are provided between the beam 12b and the projection 40, so that the nozzle assembly can be plugged into the nose assembly and easily removed for service or replacement. The fluid connector communicates with a distribution channel 44 in the interior surface of the nozzle part 14b. The distribution channel 44 conveys liquid to be sprayed from the passage 40 to the slot 18.

As can be seen in FIG. 2, the sprayheads are not horizontal but conform to the dihedral of the aircraft's wings. During spraying the liquid is supplied under positive pressure from a metering pump (not shown) and the dihedral causes no problem. However, when the aircraft reaches the end of its run over one strip, the spray is turned off while it turns to spray an adjacent strip. If there were one continuous slot 18 throughout the length of the sprayhead, there would be a tendency for the liquid to run towards the lower end of the slot leaving the upper end empty when the liquid. This would leave a short lag between the time the metering pumps were switched on and the time spraying commenced, which would leave an indeterminate and unacceptable area unsprayed. This problem is overcome by dividing the slot 18 into short independent sections, each supplied with liquid separately and each short enough that capillary action is sufficient to keep the sections full from end to end at normal attitudes and in manoeuvers normal during spraying.

Referring to FIG. 5, the sprayhead is manufactured in standard length sections. Eight sections 14.1 to 14.8 of nozzle 14 are illustrated schematically. In each section there are three separate sections of slot 18, the sections being isolated by separators provided in the spacer defining the slot 18.

Each section of slot 18 is fed by a respective separate distribution passage 44 from a respective separate fluid connector. Between the fluid connector and the respective distribution gallery 44 is a non return valve 46 which prevents one section of distribution gallery 44 draining into another. Each section of nozzle 14.1 to 14.8 has three isolated sections of slot 18 and distribution gallery 44, these being fed from a common duct 41 via a non return valve 48 and a flow regulator 42.

A problem is caused by the need to use non return valves to isolate the separate sections of the distribution gallery 44 and slot 18, in that the sorts of solvents used for pesticides for electrostatic spraying, are highly damaging to most elastomeric materials. Non return valves not using elastomers as a seal tend to rely on high spring pressures to keep them shut. This in turn leads to the valve not opening at low forward pressure and variations between valves of the flow rate at a particular pressure. This does not matter so much for the valves 48 as each is associated with a flow regulator 42. However no such regulator is associated with the valves 44. This problem can be overcome by the use in the non return valves 44, of a PTFE O-ring as a seal. Suitable O-rings are available under the trade name "CHEMRAZ" from Green Tweed and Co Inc, Detweiler Road, Kulpsville, USA.

As there is no direct connection possible, maintaining a voltage reference relative to ground poses something of a problem. A solution is described in EP-A2-0186353. Applied to the present apparatus, the circuit arrangement is shown in FIG. 3.

As shown in FIG. 6, the aircraft carries two spray head/electrode assemblies 2a, 4a and 2b, 4b. These are mounted one on each said of the aircraft, as shown in FIG. 2. There are two high voltage generators 50, 52, each powered by a battery 54. Each generator has two high voltage outputs reference to a respective ground terminal 58, 60. Both of which are connected to the body or airframe 61 of the aircraft. A $-35$ Kv output 62 of the generator 50 is connected to the surface 20a of the spray head 2a. A $-17.5$ Kv output 64 of the generator 50 is connected to the associated electrodes 4a. Similarly, a $+35$ Kv output 66 is connected to the surface 20b of the spray head 2b and a $+17.5$ Kv output is connected to the associated electrodes 4b. The generators 50 and 52 are preferably mounted in the nose assemblies of their respective sprayheads. This removes the need to make high voltage electrical connections to the sprayheads, only low voltage external connections being necessary.

It will be appreciated that atomised liquid emerging from the spray head 2b is charged positively. Liquid emerging from the spray head 2a is charged negatively. During spraying, positive current from the generator 52 flows to ground via the terminal 66, the conducting or semiconducting surface 20b in the spray head 2b and the liquid emerging from the spray head. In the absence of the connection between terminals 58 and 60, there would be no return lead for current to flow back to the generator 52 from the ground (i.e. the target). Accordingly a negative charge would build up on the generator 54.

This build up of charge on the generator 52 reduces the potential with respect to the electrode 4b, which is applied to the conducting or semiconducting surfaces 20b, thus reducing the atomising field and the charge applied to the spraying liquid. There is therefore an increase in the size of the droplets of liquid and a deterioration of spraying quality. The generator 50 would be affected similarly.

In practice if one of the generators 50 or 52 supplies more current than the other, a charge builds up on the generators. The polarity of the charge is such as to reduce the atomising field on the spray head supplied by the generator supplying the greater current. This reduces the quality of the spray from the associated spray head and the spray current from the generator is also reduced.

Conversely, the atomising field on the spray head supplied by the other generator supplying the smaller current, is increased. The quality of the spray from this spray head is therefore improved and the spray current increases until it matches that from the first generator.

In an alternative arrangement, the slot 18 can be at, rather than ahead of, the trailing edge 16. Although such an arrangement may appear to create two spraying edges because the slot, naturally, has two sides, the electrostatic effect is that of one edge. That is to say only one set of ligaments is formed centrally. If the electrostatic effect were that of two edges, ligaments would be produced off the "edges" at both sides of the slot. This concept of one edge fed by a central slot may, perhaps be better understood by considering that the fluid to be sprayed has significant conductivity and will, in use, bridge the slot.

In a yet further arrangement, more than one slot 18 can be arranged to feed liquid to a single spraying edge.

We claim:

1. Apparatus for spraying liquid electrostatically into an airstream comprising: a sprayhead having a spraying edge, an electrically conducting or semiconducting surface and means for delivering liquid to be sprayed to the edge via the surface; an electrode spaced from the edge; and high voltage supply means for generating a high voltage between the surface and the electrode, the sprayhead comprising an aerofoil the trailing edge of which constitutes the spraying edge, the sprayhead and the electrode being mounted for part of the airstream to pass between them, the shape and position of the sprayhead and the electrode producing a sufficiently low turbulence wake in the region of the spraying edge, and the electric field at the edge being intensified sufficiently when covered by liquid to be sprayed, that: the liquid at the edge is drawn out preponderantly by electrostatic forces into ligaments which break up into electrically charged droplets.

2. Apparatus as claimed in claim 1, wherein the sprayhead is a symmetrical aerofoil.

3. Apparatus as claimed in claim 2, including two electrodes, one on each side of the trailing/spraying edge.

4. Apparatus are claimed in claim 1, wherein the electrode is an aerofoil.

5. Apparatus as claimed in claim 4, in which each electrode comprises a conducting core and a sheath or cover at least partly formed of semi-insulating material having a resistivity in the range $5 \times 10^{11}$ to $5 \times 10^{13}$ ohm cm.

6. Apparatus as claimed in claim 5, in which the core and the sheath or cover are so shaped as to be closest to the sprayhead at the spraying edge, at least the part of the sheath or cover nearest the spraying edge being formed of said semi-insulating material.

7. Apparatus as claimed in claim 6, wherein the core is packed iron filings or carbon granules and the sheath or cover is said aerofoil.

8. Apparatus as claimed in any one of claims 1, 3, 4, and 7, wherein the spraying edge and the electrode or electrodes are linear.

9. Apparatus as claimed in claim 1, including a series of separate slots closely spaced along the length of the spraying edge for feeding liquid thereto, and a respective non return valve arranged to supply liquid to each slot via a respective distribution gallery.

10. Apparatus as claimed in claim 9, including a plurality of further non return valves, each arranged to feed liquid to a group of adjacent first mentioned non return valves.

11. Apparatus as claimed in claim 10, including a common feed passage to distribute liquid via individual passages to each of the said further non return valves, and a flow restricting plug extending into each individual passage from common feed passage by an amount to regulate the flow through each respective further non return valve.

* * * * *